United States Patent
Zhang et al.

(10) Patent No.: US 12,108,449 B2
(45) Date of Patent: Oct. 1, 2024

(54) SYSTEM AND METHOD FOR MULTIPLE PARALLEL MESSAGING INDICATION

(71) Applicant: ZTE CORPORATION, Guangdong (CN)

(72) Inventors: Li Zhang, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 378 days.

(21) Appl. No.: 17/510,444

(22) Filed: Oct. 26, 2021

(65) Prior Publication Data
US 2022/0046710 A1   Feb. 10, 2022

Related U.S. Application Data

(63) Continuation of application No. PCT/CN2019/085260, filed on Apr. 30, 2019.

(51) Int. Cl.
*H04W 74/0816* (2024.01)
*H04W 16/14* (2009.01)
*H04W 74/0833* (2024.01)

(52) U.S. Cl.
CPC ....... *H04W 74/0816* (2013.01); *H04W 16/14* (2013.01); *H04W 74/085* (2013.01)

(58) Field of Classification Search
CPC .................. H04W 74/0816; H04W 16/14
USPC ................ 370/329, 328, 338, 341, 345, 350
See application file for complete search history.

(56) References Cited

U.S. PATENT DOCUMENTS

| | | | |
|---|---|---|---|
| 2016/0302231 A1 | 10/2016 | Chien et al. | |
| 2017/0142754 A1* | 5/2017 | Uziel | H04W 16/14 |
| 2018/0139617 A1* | 5/2018 | Belghoul | H04W 16/14 |

FOREIGN PATENT DOCUMENTS

| | | |
|---|---|---|
| CN | 106060937 A | 10/2016 |
| CN | 106686727 A | 5/2017 |
| WO | WO-2017/028784 A1 | 2/2017 |
| WO | WO-2017/140249 A1 | 8/2017 |
| WO | WO-2018/028838 A1 | 2/2018 |

OTHER PUBLICATIONS

Interdigital, "Random access in NR-Unlicensed" 3GPP TSG-RAN WG2 Meeting #104, R2-1816776, Nov. 16, 2018, Spokane, USA (4 pages).

(Continued)

*Primary Examiner* — Nghi H Ly
(74) *Attorney, Agent, or Firm* — Foley & Lardner LLP (57) ABSTRACT

A system and method of terminating any pending listen-before-talk (LBT) attempts after they have been submitted to the physical layer of a system interconnection model if one or more of the LBT attempts succeed. The system and method include receiving a plurality of frequency resources, each of the plurality of frequency resources corresponding to a respective resource occasion. The system and method include performing, for each of the frequency resources, a listen-before-talk procedure in a first layer of an open system interconnection model. The system and method include indicating, to a second layer of the open system interconnection model, a first one of the plurality of frequency resources that succeeded in the respective listen-before-talk procedure.

20 Claims, 5 Drawing Sheets

(56) References Cited

OTHER PUBLICATIONS

Oppo, "Summary of Email discussion [105#50][NR-U] Rach 4-step and SR" 3GPP TSG-RAN WG2 Meeting #105bis, R2-1903282, Apr. 12, 2019, Xi'an, China (39 pages).
Partial European Search Report for EP Appl. No. 19927021.6, dated Apr. 14, 2022 (16 pages).
Qualcomm Incorporated, "Configuration and Selection for RACH Resources" 3GPP TSG RAN WG2 Meeting #105, R2-1902132, Mar. 1, 2019, Athens, Greece (5 pages).
Samsung, "Discussion on time/freq-domain enhancements for RACH resources" 3GPP TSG RAN WG1 #96bis, R1-1904413, Apr. 12, 2019, Xi'an, China (3 pages).
First Office Action for CN Appl. No. 201980095921.1, dated Jun. 28, 2022 (with English translation, 25 pages).
Interdigital, "Random access in NR-Unlicensed" 3GPP TSG-RAN WG2 Meeting #105bis, R2-1903554, Apr. 12, 2019, Xi'An, China (4 pages).
Zte Corporation et al., "4-step RACH procedure for NR-U" 3GPP TSG RAN WG2 NR #105bis Meeting, R2-1903537, Apr. 12, 2019, Xi'an, China (4 pages).
International Search Report and Written Opinion of the International Searching Authority for PCT/CN2019/085260 dated Feb. 1, 2020 (9 pages).

\* cited by examiner

SYSTEM AND METHOD FOR MULTIPLE PARALLEL MESSAGING INDICATION

CROSS-REFERENCE TO RELATED APPLICATION

This application claims the benefit of priority under 35 U.S.C. § 120 as a continuation of PCT Patent Application No. PCT/CN2019/085260, filed on Apr. 30, 2019, the disclosure of which is incorporated herein by reference in its entirety.

TECHNICAL FIELD

The disclosure relates generally to wireless communications and, more particularly, to systems and methods for multiple parallel messages indication.

BACKGROUND

Multiple technologies, such as Wi-Fi and Bluetooth, occupy the unlicensed 5 GHz spectrum. Using LTE in unlicensed spectrum (also referred to as, "LTE-Unlicensed" or "LTE-U") allows a telecommunication network to access additional spectrum to meet the increasing demand for mobile services. With LTE and unlicensed spectrum, small cells may be used to boost the capacity and performance of 4G networks, and because the data service is anchored in the licensed spectrum, the telecommunication network can maintain the seamless mobility and predictable performance of mobile data. With common low-power small cells connected to a common LTE core, the telecommunication network can aggregate the licensed and unlicensed spectrums to create a wider data pipe that is ideal for streaming movies, and other rich content.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes receiving, by a wireless communication device, a plurality of frequency resources, each of the plurality of frequency resources corresponding to a respective resource occasion. In some embodiments, the method includes performing, by the wireless communication device for each of the frequency resources, a listen-before-talk procedure in a first layer of an open system interconnection model. In some embodiments, the method includes indicating, by the wireless communication device to a second layer of the open system interconnection model, a first one of the plurality of frequency resources that succeeded in the respective listen-before-talk procedure.

In another embodiment, a method performed by a wireless communication node includes receiving, by a wireless communication device, a plurality of frequency resources, each of the plurality of frequency resources corresponding to a respective resource occasion. In some embodiments, the method includes performing, by the wireless communication device for each of the frequency resources, a listen-before-talk procedure in a first layer of an open system interconnection model. In some embodiments, the method includes indicating, by the wireless communication device to a second layer of the open system interconnection model, a subset of the plurality of frequency resources that succeeded in the respective listen-before-talk procedures.

In yet another embodiment, a method performed by a wireless communication node includes receiving, by a wireless communication device, a plurality of frequency resources, each of the plurality of frequency resources corresponding to a respective resource occasion. In some embodiments, the method includes performing, by the wireless communication device for each of the frequency resources, a listen-before-talk procedure in a first layer of an open system interconnection model. In some embodiments, the method includes indicating, by the wireless communication device to the first layer, a first one of the plurality of frequency resources that succeeded in the respective listen-before-talk procedure.

In yet another embodiment, a method performed by a wireless communication node includes receiving, by a wireless communication device, a plurality of frequency resources, each of the plurality of frequency resources corresponding to a respective resource occasion. In some embodiments, the method includes performing, by the wireless communication device for each of the frequency resources, a listen-before-talk procedure in a first layer of an open system interconnection model. In some embodiments, the method includes indicating, by the wireless communication device to a first layer of the open system interconnection model, a subset of the plurality of frequency resources that succeeded in the respective listen-before-talk procedures.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

To promote co-existence among devices accessing the unlicensed band, network regulations require for each device to perform a Clear Channel Assessment (CCA), or a Listen Before Talk (LBT), prior to transmitting in the unlicensed band. That is, Clear Channel Assessment uses either carrier sense (CS) or energy detection (ED) to determine the presence or absence of other signals on the channel in order to determine if the channel is occupied or clear. If the channel is occupied, then the device must wait to transmit by proceeding to the next LBT; otherwise, if the channel is clear, then the device may begin transmitting in the unlicensed band.

In some instances, however, even if a CCA procedure confirms that the band is available within a given time window, various factors (e.g., the opportunity occupation characteristics) often hinder the ability for the device to transmit within the available time window, or even at all. Consequently, the delayed or missed transmission may negatively affect the processing of the upper layers because some upper layer procedures may fail to terminate.

In order to solve these problems, some enhancements should be considered to eliminate, or at least, reduce these impacts as much as possible. For example, a device may be configured for multiple sub-band transmission opportunities—e.g., at least one RACH (Random Access Channel) resource may be configured in each sub-band. However, it may be undesirable for more than one of the sub-bands to succeed in actual transmission of RACH.

Accordingly, the systems and method discussed herein terminate any pending LBT attempts (e.g., RACH attempts) after they have been submitted to the physical layer of a system interconnection model if one or more of the LBT attempts succeed; thereby improving processing performance of the upper layers. Specifically, and discussed in greater detail below, this disclosure describes a mechanism for a wireless communication device (depicted in FIG. 1 as, UE 104) communicating with one or more wireless communication nodes (depicted in FIG. 1 as, BS 102) to terminate any pending LBT attempts in various LBT outcome scenarios (e.g., LBT failures for all frequencies, a single frequency resource of LBT success, multiple frequency resources of LBT success, LBT failures of a subset of frequencies) and from various perspectives (e.g., a MAC layer perspective, a physical layer perspective, and from both perspectives). This disclosure also describes a mechanism to terminate any pending LBT attempts involving any of the following instances: separately configuring each frequency resource, configured grant timer utilization, default/initial bandwidth part (BWP) utilization, and failures occurring in a Primary Cell (PCell) and/or a Secondary Cell (SCell).

Mobile Communication Technology and Environment

Figure 1:
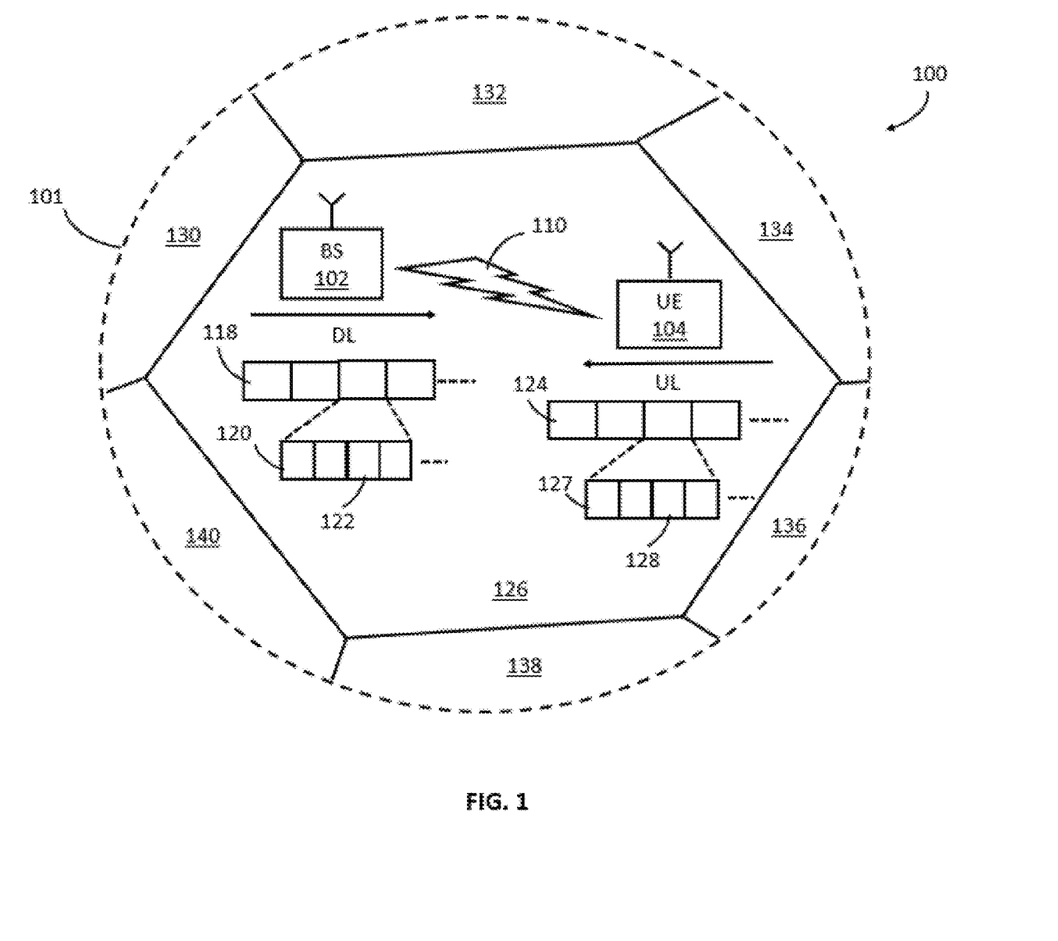
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
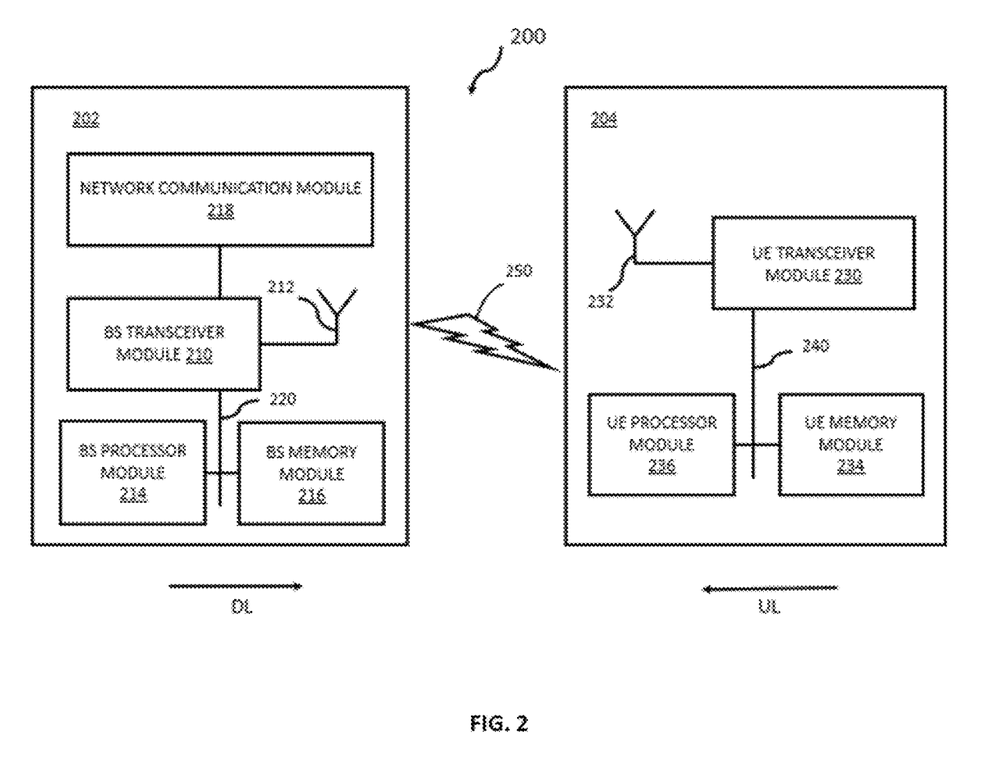
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Control (PDCL) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Multiple Parallel Messaging Indication (MPMI)

In order to increase the probability of channel access, RACH resources in multiple frequency domain resources may be configured to a wireless communication device (depicted in FIG. 1 as, UE 104), also referred to as multiple sub-band RACH resource configuration. When multiple sub-band RACH resources are configured to the wireless communication device, the wireless communication device may select one RACH occasion and preamble in each sub-band (e.g., frequency resources, multiple cell RACH attempts, etc.), and indicate them to the physical layer of an open system interconnection model. When the physical layer receives multiple RACH occasions and preambles, it will perform an LBT procedure before each RACH occasion of each sub-band. A RACH occasion is defined as a time-frequency resource on which a physical random access channel (PRACH) message, such as message 1, is transmitted using a configured PRACH preamble format.

As discussed in greater detail below, the wireless communication device may select in the Media Access Control (MAC) layer of an open system interconnection model a frequency resource and/or preamble in each frequency resource, and indicate both to the physical layer of the open system interconnection model. In response to receiving the frequency resource and/or preamble, the wireless communication device performs in the physical layer an LBT procedure before each frequency resource.

MPMI: LBT Failures for All Frequencies

In the instance where all frequency resources fail the LBT procedure, the physical layer indicates (i.e., informs, notifies, delivers, transmits, sends, messages) to the MAC layer, the LBT outcomes indicating that the LBT procedures failed for each of the frequency resources. In response to receiving the indication, the MAC layer counts the number of failures for each frequency resource, and compares each count to a predetermined threshold to determine whether to trigger a Radio Link Failure (RLF). For example, the wireless communication device receives a plurality of frequency resources, each of the plurality of frequency resources corresponding to a respective resource occasion. The wireless communication device performs for each of the frequency resources a listen-before-talk procedure in a first layer of an open system interconnection model. The wireless communication device indicates to, a second layer of the open system interconnection model and in response to a completion of the LBT procedure for all frequency resources of the plurality of frequency resources, a plurality of LBT outcomes, each of the plurality of LBT outcomes corresponding to a respective frequency resource of the plurality of frequency resources; wherein each LBT outcome indicating a failure in the respective listen-before-talk procedure.

In some embodiments, the wireless communication device in the second layer may generate a count (also referred to as, "LBT failure count"), via an LBT failure counter of the LBT outcomes for all frequency resources by adding (i.e., counting, summing) the LBT outcomes of all frequency resources as one LBT failure. For example, the one LBT failure may be a "false" value indicating that there is at least one frequency resource that succeeded the LBT procedure.

In some embodiments, the wireless communication device in the second layer may generate a count of the LBT outcomes for each frequency resource (or sub-band) by adding the LBT outcomes for each frequency resource, such to result in a plurality of counts where each count of the plurality of counts is associated with one of the frequency resources. For example, there may be a plurality of counters, where each of the plurality of counters are dedicated to one of the sub-bands. When the wireless communication device in the second layer detects a failure for one of the sub-bands, then the second layer increments the counter associated with that sub-band by one. After counting all the sub-bands, each counter will maintain (i.e., store) an integer (e.g., 1, 2, 3, 4, 5, etc.) value indicating the number of LBT failures for a respective sub-band.

In some embodiments, the wireless communication device in the second layer may generate a count of the LBT outcomes by unitedly counting all LBT failures. For example, there may be a single counter dedicated to all the sub-bands. When the wireless communication device in the second layer detects a failure for any of the sub-bands, then the second layer increments the counter associated with that sub-band by one. After counting all the sub-bands, each counter will maintain (i.e., store) an integer value indicating the number of LBT failures for a respective sub-band In some embodiments, the wireless communication device in the second layer may compare a count of LBT outcomes to a predetermined threshold to determine whether to trigger a Radio Link Failure (RLF). For example, when an LBT failure count of all sub-bands reaches a predetermined threshold, then an RLF may be triggered. As another example, when an LBT failure rate of all sub-bands reaches a predetermined threshold, then an RLF may be triggered. As another example, all LBT failures of all sub-bands may be counted together and then an LBT failure rate may be calculated based on the ratio of all LBT failure number of all sub-bands to all LBT number (i.e., LBT outcomes).

In some embodiments, the wireless communication device in the second layer may determine to not generate a random access response (RAR) window associated with a frequency resource based on determining that an LBT failure count has exceeded a predetermined threshold and/or an RLF has been triggered.

In some embodiments, the wireless communication device in the second layer may determine to start (i.e., generate) a random access response (RAR) window associated with a frequency resource based on determining that there is a sub-band of LBT success. If there is a sub-band of LBT success, then the second layer may start an RAR window. When the counter reaches a predetermined threshold, then an RLF may be triggered. In some embodiments, a predetermined threshold associated with starting an RAR window and the predetermined threshold associated with triggering an RLF may be a different value and/or the same value.

MPMI: A Single Frequency Resource of LBT Success

In the instance where there is a single frequency resource of LBT success and termination occurs from the perspective of the MAC layer, the physical layer indicates (i.e., informs, notifies, delivers, transmits, sends, messages) to the MAC layer the frequency resource that succeeded in the LBT procedure. In response to receiving the indication, the MAC layer instructs (i.e., informs, triggers, notifies) the physical layer to terminate (i.e., cancel) other pending LBT attempts (i.e., procedures). For example, a wireless communication device receives a plurality of frequency resources, where each of the plurality of frequency resources correspond to a respective resource occasion. The wireless communication device performs, for each of the frequency resources, a listen-before-talk (LBT) procedure in a first layer of an open system interconnection model. The wireless communication device indicates to a second layer of the open system interconnection model a first one of the plurality of frequency resources that succeeded in the respective listen-before-talk procedure.

In some embodiments, the wireless communication device may indicate to the first layer, in response to the second layer receiving the first frequency resource, transmission instructions. The transmission instructions may be configured to cause the first layer to transmit to a wireless communication node a random access preamble using the first frequency resource and terminate the listen-before-talk procedures that are pending. The wireless communication device may generate a Random Access Response (RAR) window based on an ending time of the random access preamble transmission.

In some embodiments, the wireless communication device may transmit to a wireless communication node a random access preamble using the first frequency resource. The wireless communication device may indicate to the first layer, in response to the second layer receiving the first frequency resource, transmission instructions. The transmission instructions may be configured to cause the first layer to terminate the listen-before-talk procedures that are pending. The wireless communication device may start (i.e., begins, generates, triggers, activates) in the second layer a Random Access Response (RAR) window based on an ending time of the random access preamble.

In some embodiments, the wireless communication device may determine in the second layer, in response to the second layer receiving the first frequency resource, a presence of a listen-before-talk procedure that is pending. The wireless communication device may prevent in the second layer, in response to determining the presence a transmission of a random access preamble using the first frequency resource, by waiting for another one of the plurality of frequency resources to succeed instead of indicating the first frequency resource to the first layer.

In the instance where there is a single frequency resource of LBT success and termination occurs from the perspective of the physical layer, the physical layer terminates the any pending LBT procedures and the MAC layer waits for the physical layer to transmit a random access preamble using the frequency resource before generating (i.e., creating, starting, initiating) a random access response (RAR) window based on an ending time of the random access preamble transmission. That is, the physical layer indicates to the MAC layer that the physical layer is transmitting or has transmitted the random access preamble using the frequency resource. In response to receiving the indication, the MAC layer starts (i.e., begins, generates, triggers, activates) an RAR window based on an ending time of the random access preamble transmission. For example, a wireless communication device receives a plurality of frequency resources, where each of the plurality of frequency resources corresponds to a respective resource occasion. The wireless communication device performs, for each of the frequency resources, a listen-before-talk procedure in a first layer of an open system interconnection model. The wireless communication device indicates to the first layer a first one of the plurality of frequency resources that succeeded in the respective listen-before-talk procedure.

In some embodiments, the wireless communication device may transmit in the first layer to a wireless communication node a random access preamble using the first frequency resource. The wireless communication device may terminate in the first layer the listen-before-talk procedures that are pending.

In some embodiments, the wireless communication device may indicate to a second layer of the open system interconnection model the transmission of the random access preamble using the first frequency resource in the first layer. The wireless communication device may start (i.e., begins, generates, triggers, activates) in the second layer a Random Access Response (RAR) window based an ending time of the random access preamble.

In some embodiments, the wireless communication device may determine in the first layer, in response to the first layer receiving the first frequency resource, a presence of a listen-before-talk procedure that is pending. The wireless communication device may prevent in the first layer, in response to determining the presence, a transmission of a random access preamble using the first frequency resource by waiting for another one of the plurality of frequency resources to succeed instead of indicating the first frequency resource to the first layer. The wireless communication device may indicate to the first layer a second one of the plurality of frequency resources that succeeded in the respective listen-before-talk procedure. The wireless communication device may transmit in the first layer to a wireless communication node a random access preamble using the second frequency resource. The wireless communication device may terminate in the first layer the listen-before-talk procedures that are pending.

MPMI: Multiple Frequency Resources of LBT Success

In the instance where there are multiple frequency resources of LBT success and termination occurs from the perspective of the MAC layer, the physical layer indicates to the MAC layer the multiple frequency resources that succeeded in the LBT procedure. In some embodiments, the multiple frequency resources may be a subset and/or all of the frequency resources that the physical layer performed an LBT procedure. In response to receiving the indication, the MAC layer selects a frequency resource from the multiple frequency resources according to (i.e., based on, as a function of, derived from, etc.) a channel condition, a frequency load, and/or Reference Signal Received Power (RSRP)/Reference Signal Received Quality (RSRQ) and informs (i.e., instructs) the physical layer of the selected frequency resource. In some embodiments, the MAC layer randomly or substantially randomly selects the frequency resource from the multiple frequency resources. In some embodiments, the MAC layer selects a random frequency resource from the multiple frequency resources. In some embodiments, informing (i.e., instructing) the physical layer of the selected frequency resource causes the physical layer to transmit to a wireless communication node a random access preamble using the selected frequency resource. In some embodiments, informing (i.e., instructing) the physical layer of the selected frequency resource causes the physical layer to terminate (i.e., cancel) any pending LBT attempts. For example, the wireless communication device receives a plurality of frequency resources, each of the plurality of frequency resources corresponding to a respective resource occasion. The wireless communication device performs for each of the frequency resources a listen-before-talk procedure in a first layer of an open system interconnection model. The wireless communication device indicates to, a second layer of the open system interconnection model, a subset of the plurality of frequency resources that succeeded in the respective listen-before-talk procedures.

In some embodiments, the wireless communication device selects in the second layer a first one of the subset of the plurality of frequency resources based on at least one of a channel condition, respective loads of the subset of the plurality of frequency resources, and a Reference Signal Received Power (RSRP)/Reference Signal Received Quality (RSRQ). For example, the wireless communication device may select in the second layer a sub-band in response to determining that a channel condition (e.g., reference signal strength indicator (RSSI), noise figure, power level, sensitivity, RSRP/RSRQ, etc.) of a sub-band associated with a successful LBT procedure is superior to a channel condition of another sub-band associated with a successful LBT procedure. The wireless communication device indicates, by the wireless communication device to the first layer, transmission instructions. The transmission instructions may be configured to cause the first layer to transmit to a wireless communication node a random access preamble using the first frequency resource and terminate the listen-before-talk procedures that are pending. The wireless communication device starts (i.e., begins, generates, triggers, activates) in the second layer a Random Access Response (RAR) window based on an ending time of the random access preamble.

In some embodiments, the wireless communication device randomly selects, by the wireless communication device in the second layer, a first one of the subset of the plurality of frequency resources. The wireless communication device indicates to the first layer transmission instructions. The transmission instructions may be configured to cause the first layer to transmit to a wireless communication node a random access preamble using the first frequency resource and terminate the listen-before-talk procedures that are pending. The wireless communication device starts (i.e., begins, generates, triggers, activates) in the second layer a Random Access Response (RAR) window based on an ending time of the random access preamble.

In some embodiments, the wireless communication device selects in the second layer a first one of the subset of the plurality of frequency resources. The wireless communication device determines in the second layer, in response to the second layer receiving the first frequency resource, a presence of a listen-before-talk procedure that is pending. The wireless communication device prevents in the second layer, in response to determining the presence, a transmission of a random access preamble using the first frequency resource by waiting for another one of the plurality of frequency resources to succeed instead of indicating the first frequency resource to the first layer.

In the instance where there are multiple frequency resources of LBT success and termination occurs from the perspective of the physical layer, the physical layer selects a frequency resource from the multiple frequency resources according to a channel condition, a frequency load, and/or Reference Signal Received Power (RSRP)/Reference Signal Received Quality (RSRQ); transmits a random access preamble using the selected frequency resource; and terminates any pending LBT attempts. In some embodiments, the multiple frequency resources may be a subset and/or all of the frequency resources that the physical layer performed an LBT procedure. In some embodiments, the physical layer randomly or substantially randomly selects the frequency resource from the multiple frequency resources. In some embodiments, the physical layer selects a random frequency resource from the multiple frequency resources. The physical layer may indicate to the MAC layer that the physical layer is transmitting or has transmitted the random access preamble using the frequency resource. In response to receiving the indication, the MAC layer starts (i.e., begins, generates, triggers, activates) an RAR window based on an ending time of the random access preamble transmission. In some embodiments, when the MAC layer is not informed about the transmission of the random access preamble, the MAC layer starts an RAR window based on a starting time of the first PDCCH occasion from the ending time of the preamble transmission. For example, the wireless communication device receives a plurality of frequency resources, where each of the plurality of frequency resources corresponding to a respective resource occasion. The wireless communication device performs for each of the frequency resources a listen-before-talk procedure in a first layer of an open system interconnection model. The wireless communication device indicates to a first layer of the open system interconnection model a subset of the plurality of frequency resources that succeeded in the respective listen-before-talk procedures.

In some embodiments, the wireless communication device selects in the first layer a first one of the subset of the plurality of frequency resources based on at least one of a channel condition, respective loads of the subset of the plurality of frequency resources, and a Reference Signal Received Power (RSRP)/Reference Signal Received Quality (RSRQ). The wireless communication device transmits in the first layer to a wireless communication node a random access preamble using the first frequency resource. The wireless communication device terminates in the first layer the listen-before-talk procedures that are pending.

In some embodiments, the wireless communication device indicates to a second layer of the open system interconnection model the transmission of the random access preamble using the first frequency resource in the first layer. The wireless communication device starts in the second layer a Random Access Response (RAR) window based on an ending time of the random access preamble.

In some embodiments, the wireless communication device selects in the first layer a random one of the subset of the plurality of frequency resources. The wireless communication device selectively transmits in the first layer to a wireless communication node a random access preamble using the random frequency resource. The wireless communication device terminates in the first layer the listen-before-talk procedures that are pending.

In some embodiments, the wireless communication devices selects in the first layer, a first one of the subset of the plurality of frequency resources. The wireless communication device determines in the first layer a presence of a listen-before-talk procedure that is pending. The wireless communication device prevents in the first layer, in response to determining the presence, a transmission of a random access preamble using the first frequency resource by instead waiting for another one of the plurality of frequency resources to succeed.

In the instance where there are multiple frequency resources of LBT success and termination occurs from both perspectives (i.e., the physical layer perspective and the MAC perspective), the physical layer selects a frequency resource from the multiple frequency resources according to a channel condition, a frequency load, and/or Reference Signal Received Power (RSRP)/Reference Signal Received Quality (RSRQ); transmits a random access preamble using the selected frequency resource; and terminates any pending LBT attempts. In some embodiments, the multiple frequency resources may be a subset and/or all of the frequency resources that the physical layer performed an LBT procedure. In some embodiments, the physical layer randomly or substantially randomly selects the frequency resource from the multiple frequency resources. In some embodiments, the physical layer selects a random frequency resource from the multiple frequency resources. The physical layer may indicate to the MAC layer that the physical layer is transmitting or has transmitted the random access preamble using the frequency resource. In response to receiving the indication, the MAC layer starts (i.e., begins, generates, triggers, activates) an RAR window based on an ending time of the random access preamble transmission. In some embodiments, when the MAC layer is not informed about the transmission of the random access preamble, the MAC layer generates an RAR window based on a starting time of the first PDCCH occasion from the ending time of the preamble transmission. For example, the wireless communication device receives a plurality of frequency resources, where each of the plurality of frequency resources corresponding to a respective resource occasion. The wireless communication device performs for each of the frequency resources a listen-before-talk procedure in a first layer of an open system interconnection model. The wireless communication device indicates to a first layer of the open system interconnection model a subset of the plurality of frequency resources that succeeded in the respective listen-before-talk procedures.

In some embodiments, the wireless communication device selects in the first layer a first one of the subset of the plurality of frequency resources, based on at least one of a channel condition, a frequency sub-band load, and a Reference Signal Received Power (RSRP)/Reference Signal Received Quality (RSRQ). The wireless communication device transmits in the first layer to a wireless communication node a random access preamble using the first frequency resource.

In some embodiments, the wireless communication device selects in the first layer a random one of the subset of the plurality of frequency resources. The wireless communication device transmits in the first layer to a wireless communication node a random access preamble using the random frequency resource.

In some embodiments, the wireless communication device selects in the first layer a first one of the subset of the plurality of frequency resources. The wireless communication device determines in the first layer a presence of a listen-before-talk procedure that is pending The wireless communication device prevents in the first layer, in response to determining the presence, a transmission of a random access preamble using the first frequency resource by instead waiting for another one of the plurality of frequency resources to succeed. The wireless communication device selects in the first layer a second one of the subset of the plurality of frequency resources based on a channel condition. The wireless communication device transmits in the first layer to a wireless communication node a random access preamble using the second frequency resource. The wireless communication device indicates to a second layer of the open system interconnection model the transmission of the random access preamble using the second frequency resource in the first layer. The wireless communication device starts (i.e., begins, generates, triggers, activates) in the second layer a Random Access Response (RAR) window based on an ending time of the random access preamble. The wireless communication device indicates to the second layer termination instructions. The termination instructions may be configured to cause the first layer to terminate the listen-before-talk procedures that are pending.

MPMI: LBT Failures for a Subset of Frequencies

In the instance where a subset (i.e., a portion) of the frequency resources fail the LBT procedure, the physical layer indicates to the MAC layer, the subset of LBT outcomes indicating that the LBT procedures failed each frequency resource of the subset of frequency resources. In response to receiving the indication, the MAC layer counts the number of failures for each frequency resource, and compares each count to a predetermined threshold to determine whether to trigger an RLF. For example, the wireless communication device receives a plurality of frequency resources, each of the plurality of frequency resources corresponding to a respective resource occasion. The wireless communication device performs for each of the frequency resources a listen-before-talk procedure in a first layer of an open system interconnection model. The wireless communication device indicates to, a second layer of the open system interconnection model, a plurality of LBT outcomes, each of the plurality of LBT outcomes corresponding to a respective frequency resource of a subset of the plurality of frequency resources; wherein each LBT outcome indicating a failure in the respective listen-before-talk procedure.

In some embodiments, the wireless communication device in the second layer may generate a count (also referred to as, "LBT failure count"), via an LBT failure counter, of the LBT outcomes for each frequency resource by adding the LBT outcomes for each frequency resources as one, such to result in a plurality of counts where each count of the plurality of counts is associated with one of the frequency resources.

In some embodiments, the wireless communication device in the second layer may generate a count of the LBT outcomes by unitedly counting all LBT failures. For example, for each sub-band LBT failure, a counter is incremented.

In some embodiments, the wireless communication device in the second layer may compare a count of LBT outcomes to a predetermined threshold to determine whether to trigger a Radio Link Failure (RLF). For example, when an LBT failure count of all sub-bands reaches a predetermined threshold, then an RLF may be triggered. As another example, when an LBT failure rate of all sub-bands reaches a threshold, then an RLF may be triggered. As another example, all LBT failures of all sub-bands are counted together and then an LBT failure rate is calculated based on the ratio of all LBT failure number of all sub-bands to all LBT number (i.e., LBT outcomes).

In some embodiments, the wireless communication device in the second layer may determine to not generate a random access response (RAR) window associated with a frequency resource based on determining that an LBT count has exceeded a threshold and or an RLF has been triggered.

In some embodiments, the wireless communication device in the second layer may determine to start (i.e., generate) a random access response (RAR) window associated with a frequency resource based on determining that there is a sub-band of LBT success. If there is a sub-band of LBT success, then the second layer may start an RAR window. When the counter reaches a predetermined threshold, then an RLF may be triggered. In some embodiments, a predetermined threshold associated with starting an RAR window and the predetermined threshold associated with triggering an RLF may be a different value and/or the same value.

MPMI: Separately Configuring Frequency Resources

Figure 3:
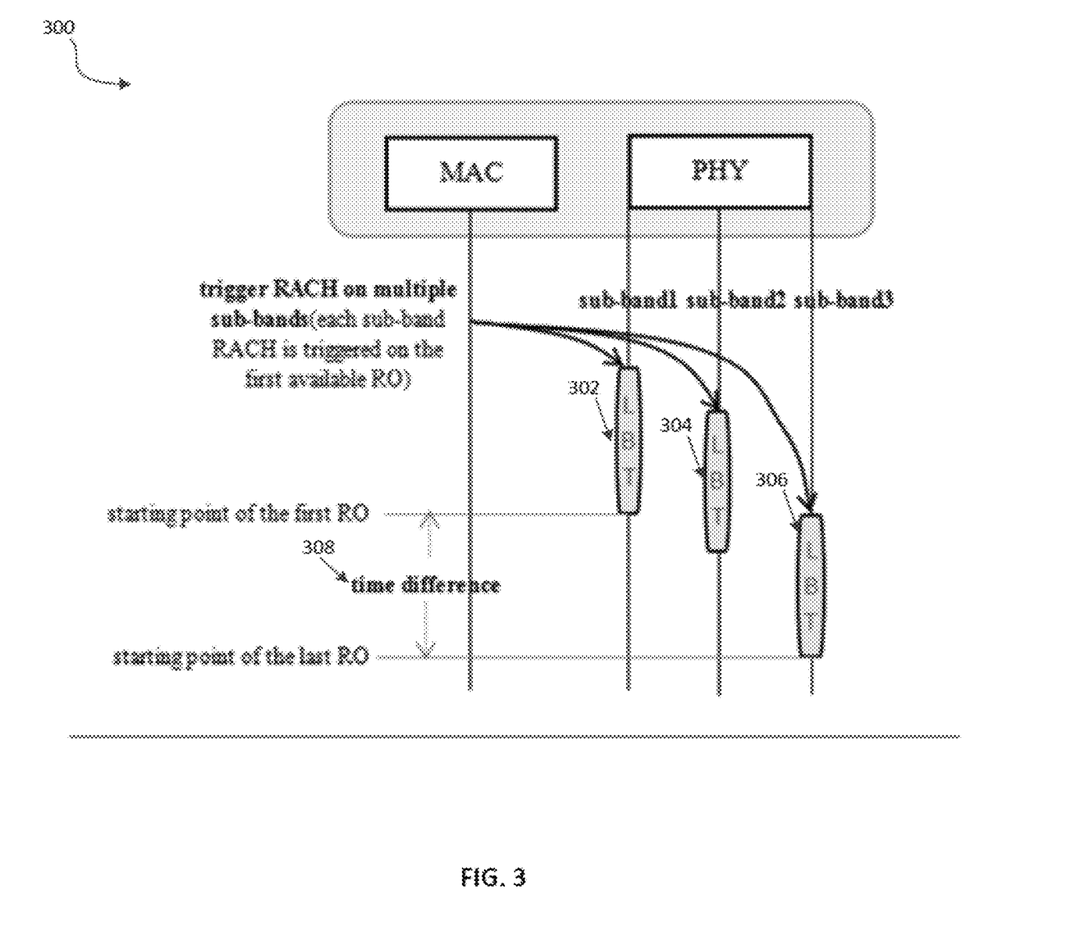
FIG. 3 is an example time-frequency graph depicting RACH occasions on multiple sub-bands, in accordance with some embodiments of the present disclosure.

FIG. 3 is an example time-frequency graph depicting RACH occasions on multiple sub-bands, in accordance with some embodiments of the present disclosure. The x-axis of the time-frequency graph 300 corresponds to the frequency domain and the y-axis corresponds to the time domain. The time-frequency graph 300 includes RACH occasion 302, RACH occasion 304, and RACH occasion 306 (collectively referred to herein as, "RACH occasion 302-306"). While each sub-band may have multiple RACH occasions, the physical layer selects only one RACH occasion per sub-band to perform an LBT procedure. Thus, each RACH occasion 302-306 corresponds to the respective sub-band that the physical layer selected to perform the LBT procedure. As shown in FIG. 3, each RACH occasion 302-306 partially overlap with one another in the time domain. The time-frequency graph 300 also includes time difference 308, which represents the time difference between the first starting time and the last starting time of all RACH occasions. For example, as shown in FIG. 3, the time difference 308 is the time difference between the starting time of RACH occasion 302 and the starting time of RACH occasion 306. Although shown in FIG. 3 with only three RACH occasions, time-frequency graph 300 may include any number of RACH occasions that overlap (completely or partially) with any number of other RACH occasions.

Still referring to FIG. 3, in order to increase the probability of channel access, a wireless communication device (depicted in FIG. 1 as, UE 104) may be configured to use RACH resources in multiple frequency domain resources, also referred to as multiple sub-band RACH resource configuration. In some instances, when the time domain resource of each sub-band is separately configured to a wireless communication device, the time domain difference (e.g., time difference 308) between the selected RACH occasions in multiple sub-bands may be large. However, in the case where the LBTs in all the sub-bands fail and the LBT failures of all sub-bands are counted as one LBT failure (as discussed herein), then the large time domain difference may significantly degrade the performance of the wireless communication device and/or wireless communication node.

In some embodiments, to address a large time domain difference between RACH occasions, the wireless communication device may count the LBT failures of sub-bands of overlapping (or partially overlapping) RACH occasions as one LBT failure.

In some embodiments, to address a large time domain difference between RACH occasions, the time difference (e.g., time difference 308) between the first starting time and the last starting time of all RACH occasions may be restricted within a predetermined range. For example, when a time difference is less than a predetermined threshold, then the wireless communication device may count the LBT failures of all sub-bands as one LBT failure. That is, the wireless communication device counts the LBT failures corresponding to sub-bands of RACH occasions that satisfy the predetermined threshold as one LBT failure.

MPMI: Configured Grant Timer

In some embodiments, a configured grant retransmission timer (also referred to as, "CG retransmission timer") may be used for configured grant transmission. For example, the CG retransmission timer may be started in response to a wireless communication device transmitting a transmission block (TB) on the configured grant. The CG retransmission timer may be stopped in response to the wireless communication device receiving a Hybrid Automatic Repeat Request (HARQ) feedback or dynamic grant for the HARQ process. If the timer expires, then the wireless communication device may assume a Non-Acknowledgment (NACK) and perform an auto retransmission on the configured grant.

In some embodiments, a configured grant timer may be used for configured grant transmission. For example, when the configured grant timer is started, the wireless communication device may wait for receipt of a HARQ feedback or a dynamic grant within the timer. If the timer expires, then the wireless communication device may assume an Acknowledgement (ACK).

In some embodiments, a channel occupancy state may indicate whether a CG retransmission timer or a configured grant timer should be used for configured grant transmission. For example, a network may configure the timer based on the statistics of channel occupancy state. When the channel occupancy rate is low (i.e., a channel may be achieved easily), then the wireless communication device may be configured to use the configured grant timer for configured grant transmission. However, when channel occupancy rate is high in relation to LBT impact, then the wireless communication device may be configured to use the CG retransmission timer for configured grant transmission.

MPMI: Default/Initial Bandwidth Part Utilization

For Scheduling Request (SR)/Physical Uplink Shared Channel (PUSCH), the processing of LBT failures may depend on the default/initial bandwidth part utilization (BWP). In some embodiments, when the wireless communication device is on the default/initial BWP, the wireless communication device may indicate an LBT failure problem to the upper layer when an LBT failure occurs (e.g., the number of LBT failure number reaches a threshold). In some embodiments, when the wireless communication device is on an active BWP that is different from the default/initial BWP, the wireless communication device may switch to the default BWP to perform a RACH procedure when an LBT failure occurs (e.g., the number of LBT failure number reaches a threshold). In some embodiments, if a RACH resource is not configured in the default BWP, then the wireless communication device may switch to the initial BWP. In some embodiments, if a timer used for a RACH procedure expires or LBT failure number reaches a threshold, then the LBT failure problem may be indicated to the upper layer.

For a RACH procedure, the processing of LBT failures may depend on the default/initial bandwidth part utilization (BWP). In some embodiments, when the wireless communication device is on the default/initial BWP, the wireless communication device may indicate an LBT failure problem to the upper layer when an LBT failure occurs (e.g., a timer used for RACH procedure expires or an LBT failure number reaches a threshold). In some embodiments, when the wireless communication device is on an active BWP that is different from the default/initial BWP, the wireless communication device may switch to the default BWP to perform a RACH procedure when an LBT failure occurs (e.g., a timer used for RACH procedure expires or LBT failure number reaches a threshold). In some embodiments, if a RACH resource is not configured in the default BWP, then the wireless communication device may switch to the initial BWP. In some embodiments, if LBT fails in the default/initial BWP, then the LBT failure problem may be indicated to the upper layer In some embodiments, when a RACH procedure is triggered, then the timer may be started. In some embodiments, if the timer expires, then the RACH procedure fails.

MPMI: Failures Occurring in a Primary Cell and/or a Secondary Cell

In some embodiments, if an LBT failure occurs in a secondary cell (SCell) of a master cell group (MCG) and when an LBT failure problem is indicated to the upper layer, then LBT failure information associated with the LBT failure problem may be sent to the network by the current radio resource control (RRC) signaling or a new RRC message. In some embodiments, an RRC message may include an SCell index and/or the cause (e.g., LBT failure). In some embodiments, the wireless communication device may deactivate the SCell.

In some embodiments, if an LBT failure occurs in an SCell of a secondary cell group (SCG), then the wireless communication device may deactivate the SCell. In some embodiments, when an LBT failure problem is indicated to the upper layer, then LBT failure information associated with the LBT failure may be sent to the network by SCGfailureinformation, other RRC message, or a new RRC message. In some embodiments, an RRC message may include SCell index and the cause (e.g., LBT failure). In some embodiments, the wireless communication device may also deactivate the SCell.

In some embodiments, if an LBT failure of an MCG SCell and/or an SCG SCell occurs, then the wireless communication device may be sent the LBT failure to the network by an RRC message, such as the current RRC message or a new RRC message.

In some embodiments, if an LBT failure occurs in a Primary Cell (PCell), then an LBT failure may trigger an RLF.

Figure 4:
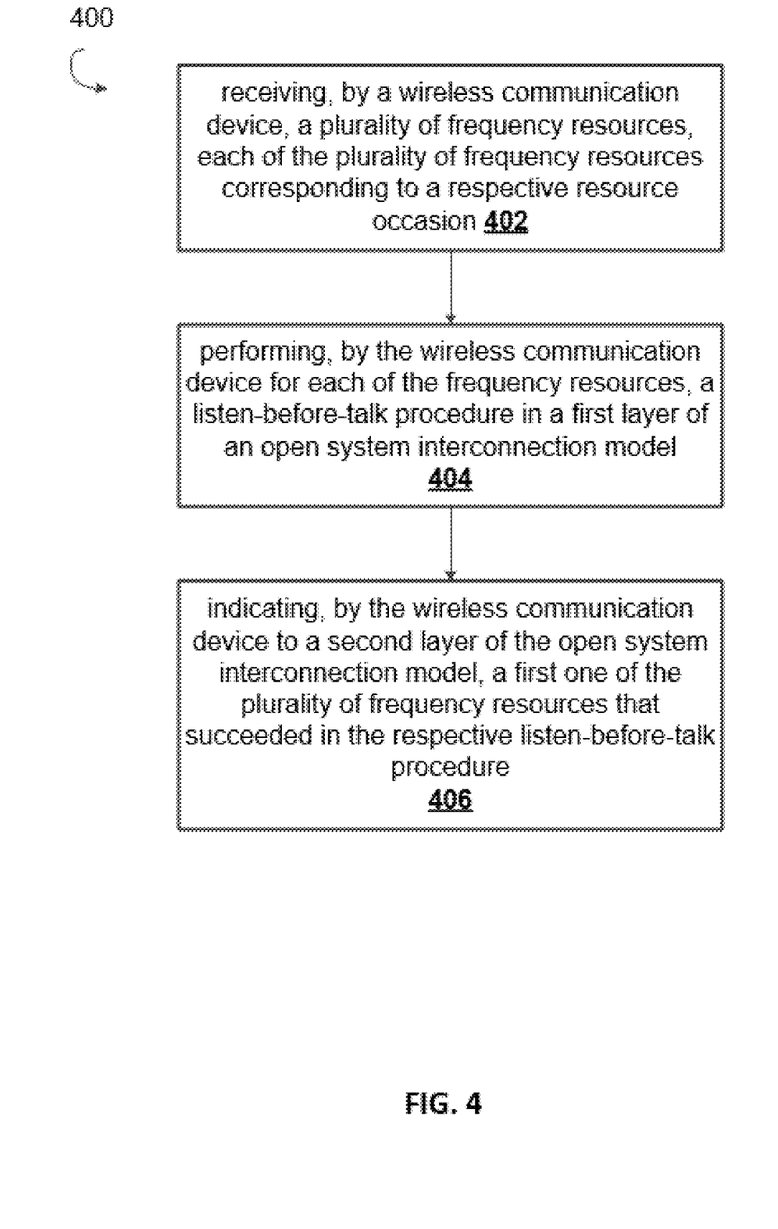
FIG. 4 is a flow diagram depicting a method for multiple parallel messages indication when an LBT procedure of one frequency resource succeeds, in accordance with some embodiments of the present disclosure.

FIG. 4 is a flow diagram depicting an example method for multiple parallel messages indication when an LBT procedure of one frequency resource succeeds, in accordance with some embodiments of the present disclosure. Additional, fewer, or different operations may be performed in the method depending on the particular embodiment. In some embodiments, some or all operations of method 400 may be performed by a wireless communication node, such as BS 102 in FIG. 1. In some operations, some or all operations of method 400 may be performed by a wireless communication device, such as UE 104 in FIG. 1. Each operation may be re-ordered, added, removed, or repeated.

As shown, the method 400 includes the operation 402 of receiving, by a wireless communication device, a plurality of frequency resources, each of the plurality of frequency resources corresponding to a respective resource occasion. The method also includes the operation 404 of performing, by the wireless communication device for each of the frequency resources, a listen-before-talk procedure in a first layer of an open system interconnection model. The method also includes the operation 406 of indicating, by the wireless communication device to a second layer of the open system interconnection model, a first one of the plurality of frequency resources that succeeded in the respective listen-before-talk procedure.

Figure 5:
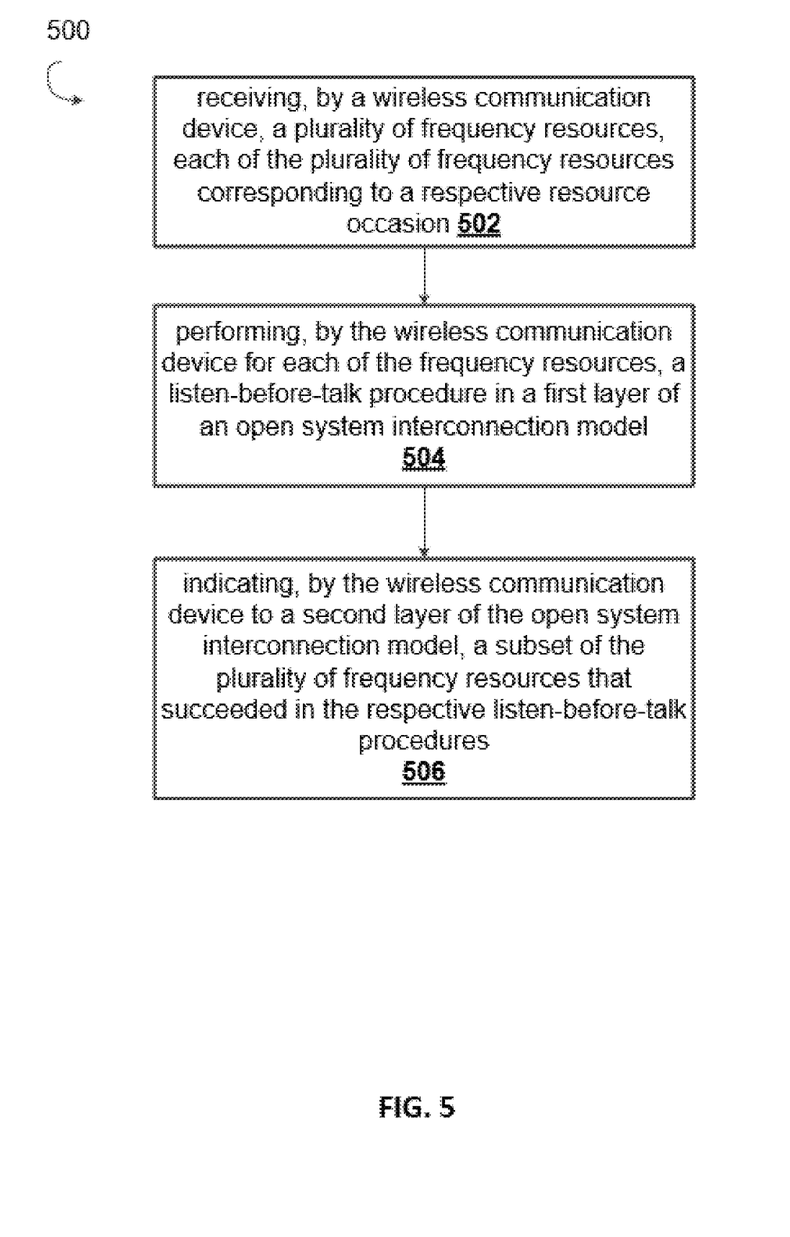
FIG. 5 is a flow diagram depicting a method for multiple parallel messages indication when LBT procedures of multiple frequency resources succeed, in accordance with some embodiments of the present disclosure.

FIG. 5 is a flow diagram depicting an example method for multiple parallel messages indication when LBT procedures of multiple frequency resources succeed, in accordance with some embodiments of the present disclosure. Additional, fewer, or different operations may be performed in the method depending on the particular embodiment. In some embodiments, some or all operations of method 500 may be performed by a wireless communication node, such as BS 102 in FIG. 1. In some operations, some or all operations of method 400 may be performed by a wireless communication device, such as UE 104 in FIG. 1. Each operation may be re-ordered, added, removed, or repeated.

As shown, the method 500 includes the operation 502 of receiving, by a wireless communication device, a plurality of frequency resources, each of the plurality of frequency resources corresponding to a respective resource occasion. The method also includes the operation 504 of performing, by the wireless communication device for each of the frequency resources, a listen-before-talk procedure in a first layer of an open system interconnection model. The method also includes the operation 506 of indicating, by the wireless communication device to a second layer of the open system interconnection model, a subset of the plurality of frequency resources that succeeded in the respective listen-before-talk procedures.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
receiving, by a wireless communication device, a plurality of frequency resources, each of the plurality of frequency resources corresponding to a respective resource occasion;
performing, by the wireless communication device for each of the frequency resources, a listen-before-talk procedure in a first layer of an open system interconnection model;
indicating, by the wireless communication device to a second layer of the open system interconnection model, a subset of the plurality of frequency resources that succeeded in the respective listen-before-talk procedures; and
responsive to the indication to the second layer, instructing, by the wireless communication device, the first layer to terminate the listen-before-talk procedures that are pending.

2. The method of claim 1, further comprising:
selecting, by the wireless communication device in the second layer, a first one of the subset of the plurality of frequency resources based on at least one of a channel condition, respective loads of the subset of the plurality of frequency resources, and a Reference Signal Received Power (RSRP)/Reference Signal Received Quality (RSRQ);
indicating, by the wireless communication device to the first layer, transmission instructions, wherein the transmission instructions are configured to cause the first layer to transmit to a wireless communication node a random access preamble using the first frequency resource and terminate the listen-before-talk procedures that are pending; and
generating, by the wireless communication device in the second layer, a Random Access Response (RAR) window based on an ending time of the random access preamble.

3. The method of claim 1, further comprising:
randomly selecting, by the wireless communication device in the second layer, a first one of the subset of the plurality of frequency resources;
indicating, by the wireless communication device to the first layer, transmission instructions, wherein the transmission instructions are configured to cause the first layer to transmit to a wireless communication node a random access preamble using the first frequency resource and terminate the listen-before-talk procedures that are pending; and generating, by the wireless communication device in the second layer, a Random Access Response (RAR) window based on an ending time of the random access preamble.

4. The method of claim 1, further comprising:

selecting, by the wireless communication device in the second layer, a first one of the subset of the plurality of frequency resources;

determining, by the wireless communication device in the second layer and in response to the second layer receiving the first frequency resource, a presence of a listen-before-talk procedure that is pending; and preventing, by the wireless communication device in the second layer and in response to determining the presence, a transmission of a random access preamble using the first frequency resource by waiting for another one of the plurality of frequency resources to succeed instead of indicating the first frequency resource to the first layer.

5. A wireless communications apparatus comprising a processor, wherein the processor is configured to read code and implement a method recited in claim 1.

6. A computer program product comprising a non-transitory computer-readable program medium code stored thereupon, the code, when executed by a processor, causing the processor to implement a method recited in claim 1.

7. A method, comprising:

receiving, by a wireless communication device, a plurality of frequency resources, each of the plurality of frequency resources corresponding to a respective resource occasion;

performing, by the wireless communication device for each of the frequency resources, a listen-before-talk procedure in a first layer of an open system interconnection model;

indicating, by the wireless communication device to the first layer, a first one of the plurality of frequency resources that succeeded in the respective listen-before-talk procedure; and responsive to the indication to the first layer, instructing, by the wireless communication device, the first layer to terminate the listen-before-talk procedures that are pending.

8. A wireless communications apparatus comprising a processor, wherein the processor is configured to read code and implement a method recited in claim 7.

9. A computer program product comprising a non-transitory computer-readable program medium code stored thereupon, the code, when executed by a processor, causing the processor to implement a method recited in claim 7.

10. A method, comprising:

receiving, by a wireless communication device, a plurality of frequency resources, each of the plurality of frequency resources corresponding to a respective resource occasion;

performing, by the wireless communication device for each of the frequency resources, a listen-before-talk procedure in a first layer of an open system interconnection model;

indicating, by the wireless communication device to a first layer of the open system interconnection model, a subset of the plurality of frequency resources that succeeded in the respective listen-before-talk procedures; and responsive to the indication to the first layer, instructing, by the wireless communication device, the first layer to terminate the listen-before-talk procedures that are pending.

11. The method of claim 10, further comprising:

selecting, by the wireless communication device in the first layer, a first one of the subset of the plurality of frequency resources based on at least one of a channel condition, respective loads of the subset of the plurality of frequency resources, and a Reference Signal Received Power (RSRP)/Reference Signal Received Quality (RSRQ);

transmitting, by the wireless communication device in the first layer, to a wireless communication node a random access preamble using the first frequency resource; and terminating, by the wireless communication device in the first layer, the listen-before-talk procedures that are pending.

12. A wireless communications apparatus comprising a processor, wherein the processor is configured to read code and implement a method recited in claim 11.

13. The method of claim 10, further comprising:

indicating, by the wireless communication device to a second layer of the open system interconnection model, the transmission of the random access preamble using the first frequency resource in the first layer; and generating, by the wireless communication device in the second layer, a Random Access Response (RAR) window based on an ending time of the random access preamble.

14. The method of claim 10, further comprising:

selecting, by the wireless communication device in the first layer, a random one of the subset of the plurality of frequency resources;

selectively transmitting, by the wireless communication device in the first layer, to a wireless communication node a random access preamble using the random frequency resource; and terminating, by the wireless communication device in the first layer, the listen-before-talk procedures that are pending.

15. The method of claim 10, further comprising:

selecting, by the wireless communication device in the first layer, a first one of the subset of the plurality of frequency resources;

determining, by the wireless communication device in the first layer, a presence of a listen-before-talk procedure that is pending; and preventing, by the wireless communication device in the first layer and in response to determining the presence, a transmission of a random access preamble using the first frequency resource by instead waiting for another one of the plurality of frequency resources to succeed.

16. The method of claim 10, further comprising:

selecting, by the wireless communication device in the first layer, a first one of the subset of the plurality of frequency resources based on at least one of a channel condition, a frequency resource load, and a Reference Signal Received Power (RSRP)/Reference Signal Received Quality (RSRQ); and transmitting, by the wireless communication device in the first layer, to a wireless communication node a random access preamble using the first frequency resource.

17. The method of claim 10, further comprising:

selecting, by the wireless communication device in the first layer, a random one of the subset of the plurality of frequency resources; and transmitting, by the wireless communication device in the first layer, to a wireless communication node a random access preamble using the random frequency resource.

18. The method of claim 10, further comprising:
selecting, by the wireless communication device in the first layer, a first one of the subset of the plurality of frequency resources;
determining, by the wireless communication device in the first layer, a presence of a listen-before-talk procedure that is pending;
preventing, by the wireless communication device in the first layer and in response to determining the presence, a transmission of a random access preamble using the first frequency resource by instead waiting for another one of the plurality of frequency resources to succeed;
selecting, by the wireless communication device in the first layer, a second one of the subset of the plurality of frequency resources based on a channel condition;
transmitting, by the wireless communication device in the first layer, to a wireless communication node a random access preamble using the second frequency resource;
indicating, by the wireless communication device to a second layer of the open system interconnection model, the transmission of the random access preamble using the second frequency resource in the first layer;
generating, by the wireless communication device in the second layer, a Random Access Response (RAR) window based on an ending time of the random access preamble; and
indicating, by the wireless communication device to the second layer, termination instructions, wherein the termination instructions are configured to cause the first layer to terminate the listen-before-talk procedures that are pending.

19. A wireless communications apparatus comprising a processor, wherein the processor is configured to read code and implement a method recited in claim 10.

20. A computer program product comprising a non-transitory computer-readable program medium code stored thereupon, the code, when executed by a processor, causing the processor to implement a method recited in claim 10.

* * * * *